United States Patent
Zaman et al.

(10) Patent No.: US 7,783,924 B2
(45) Date of Patent: Aug. 24, 2010

(54) SYSTEM AND METHOD FOR COMMUNICATION BETWEEN A CONTROLLER AND A POWER SUPPLY USING A COMMUNICATION INTERFACE

(75) Inventors: Sabih Qamar-Uz Zaman, Elm Gorve, WI (US); Olgun Kukrer, Waukesha, WI (US); Manfred David Boehm, Waukesha, WI (US)

(73) Assignee: General Electric Company, Schenectady, NY (US)

(*) Notice: Subject to any disclaimer, the term of this patent is extended or adjusted under 35 U.S.C. 154(b) by 986 days.

(21) Appl. No.: 11/213,088

(22) Filed: Aug. 26, 2005

(65) Prior Publication Data

US 2007/0050648 A1    Mar. 1, 2007

(51) Int. Cl.
*G06F 11/00* (2006.01)
(52) U.S. Cl. .............................. 714/22; 714/14; 713/340
(58) Field of Classification Search .................. 714/22, 714/14; 713/340
See application file for complete search history.

(56) References Cited

U.S. PATENT DOCUMENTS

| | | | | |
|---|---|---|---|---|
| 4,495,568 A * | 1/1985 | Gilbert et al. .................. | 714/22 |
| 4,757,505 A * | 7/1988 | Marrington et al. ............ | 714/22 |
| 4,812,677 A * | 3/1989 | Perry ........................... | 326/14 |
| 4,868,832 A * | 9/1989 | Marrington et al. ............ | 714/22 |
| 5,481,730 A * | 1/1996 | Brown et al. ................. | 713/340 |
| 5,664,203 A * | 9/1997 | Hong et al. ................... | 713/323 |
| 6,115,822 A * | 9/2000 | Kim et al. ..................... | 713/310 |
| 6,594,771 B1 * | 7/2003 | Koerber et al. ............... | 713/330 |
| 6,735,704 B1 * | 5/2004 | Butka et al. .................. | 713/300 |
| 6,810,481 B1 * | 10/2004 | Kawade et al. ............... | 713/300 |
| 6,996,746 B2 * | 2/2006 | Shukla et al. ................. | 714/24 |
| 7,120,812 B2 * | 10/2006 | Teradaira et al. ............. | 713/340 |
| 7,131,019 B2 * | 10/2006 | Lee .............................. | 713/340 |
| 7,152,175 B2 * | 12/2006 | Madany et al. ............... | 713/340 |
| 7,240,222 B1 * | 7/2007 | Falik et al. .................... | 713/300 |
| 7,287,170 B2 * | 10/2007 | Sadowski ..................... | 713/300 |
| 7,313,714 B1 * | 12/2007 | Helfinstine et al. ........... | 713/340 |
| 7,320,077 B2 * | 1/2008 | Kim ............................. | 713/300 |
| 7,334,139 B2 * | 2/2008 | Tanikawa ..................... | 713/300 |
| 7,363,520 B1 * | 4/2008 | Maier et al. .................. | 713/300 |
| 7,581,122 B2 * | 8/2009 | Kim et al. ..................... | 713/300 |
| 2001/0027532 A1 * | 10/2001 | Hoshino et al. .............. | 713/340 |
| 2002/0194517 A1 * | 12/2002 | Cohen et al. ................. | 713/340 |
| 2003/0123612 A1 * | 7/2003 | Pelc et al. ..................... | 378/137 |
| 2004/0148547 A1 * | 7/2004 | Thompson et al. ............ | 714/22 |
| 2005/0049729 A1 * | 3/2005 | Culbert et al. ................ | 700/50 |
| 2005/0121505 A1 * | 6/2005 | Metz et al. ................... | 235/375 |
| 2005/0289378 A1 * | 12/2005 | Vorenkamp et al. ......... | 713/340 |

* cited by examiner

*Primary Examiner*—Robert Beausoliel
*Assistant Examiner*—Charles Ehne
(74) *Attorney, Agent, or Firm*—McAndrews, Held & Malloy, Ltd.; Peter J. Vogel; Michael A. Dellapenna

(57) ABSTRACT

Certain embodiments of the present invention provide for a system for communication between a controller and a power supply using a communication interface. In an embodiment, a communication system includes a power supply having one or more diagnostics. The communication system also includes a controller, configured for controlling the power supply and monitoring the one or more diagnostics of the power supply. In addition, the communication system includes a communication interface, configured to receive from the controller and send from the power supply one or more signals. The communication system also includes a load, configured to operate using the power provided by said power supply.

17 Claims, 4 Drawing Sheets

SYSTEM AND METHOD FOR COMMUNICATION BETWEEN A CONTROLLER AND A POWER SUPPLY USING A COMMUNICATION INTERFACE

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Embodiments of the present invention provide a system and method for communication between a controller and a power supply using a communication interface, and, more particularly, to a method of assuring proper operation of a medical imaging device using a communication interface to allow control and feedback of the power supply using an intelligent controller and a minimum number of lines.

Various power supplies, such as a detector power supply used in X-Ray or other medical imaging devices, are not simply powered on and kept on. Detector power supplies used in medical imaging devices, or other device specific power supplies, Power Distribution Units (PDU) and Uninterrupted Power Supplies (UPS), require discrete control as well as feedback to indicate the status of the power supply. For example, diagnostics, such as On/Off, standby, error status levels, voltage levels, current levels, power consumption, and the like, may need to be monitored by a controller to ensure safe operating conditions.

Currently, dedicated Input/Output (I/O) lines are used to communicate between a controller and a power supply. Using dedicated I/O lines has many drawbacks, however. For example, using dedicated I/O lines requires a separate line for each diagnostic. Requiring a separate line for each diagnostic being monitored may limit the number of diagnostics that may be monitored or it may require an abundance of lines to accomplish a desired result. A large amount of I/O lines may be expensive and time consuming to install and configure. Further, a dedicated I/O line may not be easily used for purposes other than that for which the dedicated I/O line was originally intended because of the difficulty in reconfiguring or installing and configuring new dedicated I/O lines. Therefore, for example, it may be difficult for a technician or operator to change the diagnostics to be monitored.

Communication interfaces, such as Universal Serial Bus (USB), CANopen, Ethernet, firewire, and RS232, for example, are capable of using minimal lines, with each line capable of sending and/or receiving a variety of information. For example, multiple diagnostics may be monitored using one line of a communication interface. Further, communication interfaces are easily reconfigured, so if a user or technician needed to alter the diagnostics monitored, reconfiguration is fast, easy, and inexpensive. Thus, a need exists for an efficient, robust, cost effective system and method for communication between a controller and power supply using a standard communication interface.

SUMMARY OF THE INVENTION

Certain embodiments of the present invention provide system for communication between a controller and a power supply using a communication interface. In an embodiment, the communication system may include a power supply. The communication system may also include a controller, configured for controlling the power supply and monitoring one or more diagnostics of the power supply. In addition, the communication system may include a communication interface, adapted to receive from the controller and send from the power supply one or more signals. The communication system may also include a load, adapted to operate using the power provided by said power supply.

In an embodiment, the power supply may be a Power Distribution Unit (PDU), Uninterrupted Power Supply (UPS), and/or a device specific power supply. Further, the device specific power supply may be a detector power supply used in medical imaging devices. In an embodiment, the communication interface may be a Universal Serial Bus (USB), a CANopen communication interface, an Ethernet communication interface, a firewire communication interface, and/or an RS232 communication interface, for example. One or more diagnostics may include one or more voltage levels, one or more current levels, a power consumption level, a noise on the line level, one or more error status levels, an On/Off level, and/or a standby level. In an embodiment, the communication interface may be physically attached to the power supply. In an embodiment, the one or more signals may be transmitted and received via a wireless connection.

Certain embodiments of the present invention provide method for communication between a controller and a power supply using a communication interface. In an embodiment, the method for communication may include sending, from a controller, one or more commands and/or one or more requests for one or more diagnostics of a power supply. The method may also include receiving, using a communication interface, the one or more commands and/or the one or more requests for one or more diagnostics of the power supply. In addition, the method may include responding with a feedback response message, using a communication interface, to the one or more commands and/or the one or more requests for the one or more diagnostics of the power supply. The method for communication may also include monitoring the one or more diagnostics of the power supply using the feedback response message sent by the power supply to the controller using the communication interface.

In an embodiment, the one or more commands may be a power on command, a power off command, a reset command, and/or a standby command. The controller may be a computer. The power supply may be a Power Distribution Unit (PDU), Uninterrupted Power Supply (UPS), and/or a device specific power supply. Further, the device specific power supply may be a detector power supply used in medical imaging devices. In an embodiment, the communication interface may be a Universal Serial Bus (USB), a CANopen communication interface, an Ethernet communication interface, a firewire communication interface, and/or an RS232 communication interface, for example. One or more diagnostics may include one or more voltage levels, one or more current levels, a power consumption level, a noise on the line level, one or more error status levels, an On/Off level, and/or a standby level. In an embodiment, the communication interface may be physically attached to the power supply. In an embodiment, the sending, responding, and receiving may be via a wireless connection.

Certain embodiments of the present invention provide a computer-readable storage medium including a set of instructions for a computing device. In an embodiment, the set of instructions may include a sending routine for routing one or more command messages from a controller to a power supply using a communication interface. The set of instructions may also include a receiving routine for receiving the one or more command messages at the communication interface and directing the one or more command messages to the power supply. In addition, the set of instructions may include a responding routine for routing one or more feedback messages from the power supply to the controller using the communication interface. The set of instructions may also include a monitoring routine for processing the one or more feedback messages at the controller.

In an embodiment, the one or more command messages may be one or more commands and/or one or more requests for one or more diagnostics of the power supply. Further, the computing device may be a personal computer, a workstation, a single-board computer, and/or a Programmable Logic Device (PLD). In an embodiment, a diagnostic of the power supply may be reconfigured based on the one or more feedback message.

Figure 1:
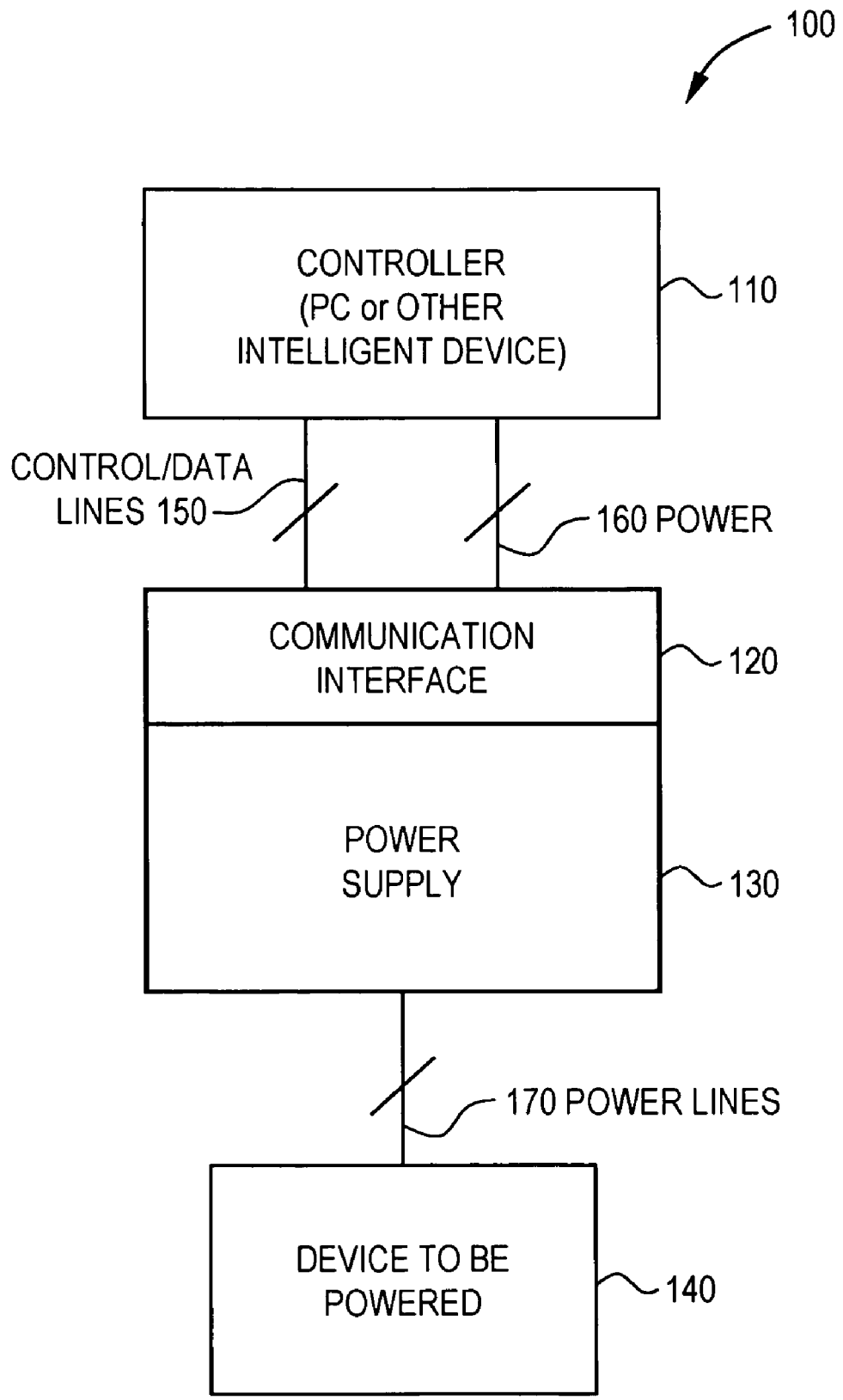
FIG. 1 illustrates a simplified block diagram of a communication system, according to an embodiment of the present invention.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DETAILED DESCRIPTION OF THE INVENTION

FIG. 1 illustrates a simplified block diagram of a communication system 100, according to an embodiment of the present invention. The communication system 100 includes a controller 110, a communication interface 120, a power supply 130, a device to be powered (load) 140, control/data lines 150, and power lines 170 to the device 140. The communication system 100 may also include a power line 160 for providing input power to the power supply 130. The power line 160 may also provide the communication interface 120 with power if needed. Alternatively, the communication interface may be powered by the power supply 130 or using other means, for example. The controller 110 is in communication with a power supply 130 via a communication interface 120. The control/data lines 150, which carry the signals sent and received between the controller 110 and power supply 130 via a communication interface 120 may be wired or wireless connections.

In an embodiment, the controller 110 may be a personal computer or some other computing device capable of monitoring and controlling a power supply 130, such as a workstation, a single-board computer, and/or a Programmable Logic Device (PLD), among other things. The controller 110 may monitor the diagnostics of the power supply 130, such as voltage levels, current levels, power consumption, noise on the line, error status, On/Off, and standby, among other things. For example, after commanding the power supply 130 via the communication interface 120 to "power on" the device 140, the controller 110 may receive feedback from the power supply 130 via the communication interface 120 regarding various diagnostics. If the controller receives feedback indicating that any of the diagnostics are outside of an operating level (which may be a predetermined level programmed on the controller 110 and/or a manually determined level by an operator of the controller 110), the controller 110 may command the power supply 130 via the communication interface 120 to "power off," go into a standby state, or other like command. Programming the controller 110 to monitor certain diagnostics and/or manually monitoring the diagnostics displayed on the controller 110, helps to ensure the power supply 130 effectively provides the power needed via the power lines 170 to the device to be powered 140 without damage to the device 140 or other various problems.

In an embodiment, the communication interface 120 may be used to send and receive signals between the controller 110 and a power supply 130. The communication interface may be a Universal Serial Bus (USB) communication interface, a CANopen communication interface, an Ethernet communication interface, a firewire communication interface, a RS232 communication interface, or other like communication interface. The communication interface 120 may have a separate power supply line 160 or it may draw power from the power supply 130, for example, or some other source. Information transmitted and received via the communication interface 120 between the controller 110 and the power supply 130 may use wired control/data lines 150 or a wireless connection 150.

In operation, the controller 110 may monitor various diagnostics of the power supply by sending messages through the wired or wireless control/data lines 150 to the communication interface 120. The power supply 130, which may be connected to the communication interface 120, receives the messages or commands from the controller 110 and sends feedback using the communication interface 120 and wired or wireless control/data lines back to the controller 110. For example, the controller may query the output voltage levels of the power supply 130. The power supply 130, after receiving the query output voltage message, will send feedback containing the one or more output voltage levels to the controller 110 using the communication interface 120 and wired or wireless control/data lines 150.

In an embodiment, the power supply 130, which receives commands from a controller and provides feedback to the controller 110 via the communication interface 120, provides power to a device 140. The power supply 130 may supply power to the device (load) 140 through power lines 170, among other things. The communication interface 120 may be physically attached to the power supply 130 in order to send and receive signals between the power supply 130 and the controller 110. The power supply 130 may be a Power Distribution Unit (PDU), an Uninterrupted Power Supply (UPS), a device specific power supply, for example, or any other power supply. For example, the power supply 130 may be a detector power supply used to power an X-Ray device. The power line 160 may provide input power to the power supply 130, among other things.

Figure 2:
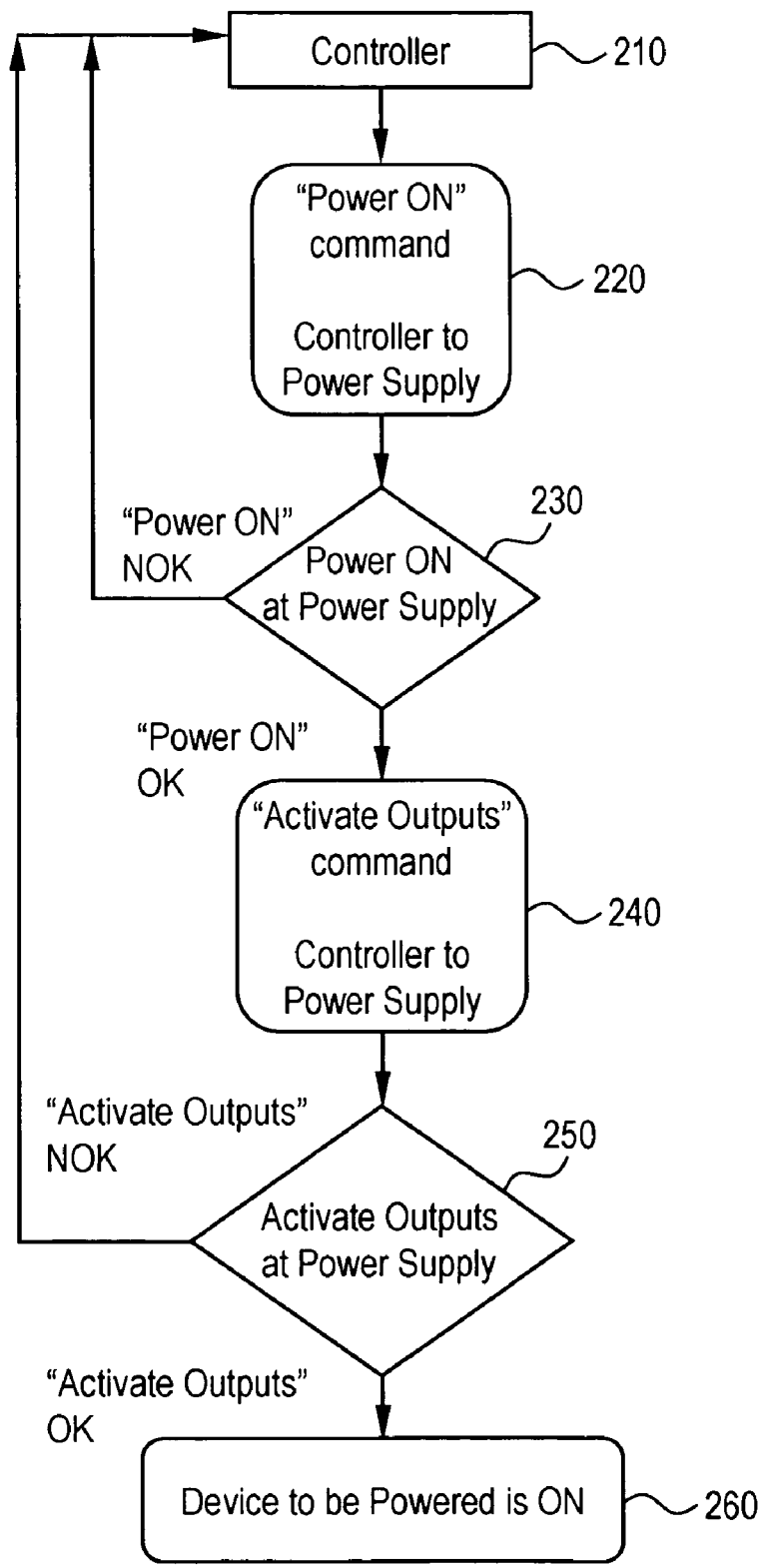
FIG. 2 illustrates a flow chart of an exemplary "power on" and "activating outputs" command sequence of a controller to a power supply with a communication interface, according to an embodiment of the present invention.

FIG. 2 illustrates a flow chart of an exemplary "power on" and "activating outputs" command sequence 200 of a controller 110 to a power supply 130 with a communication interface 120, according to an embodiment of the present invention.

First, at step 220, the controller 210 sends a message to the power supply 130 commanding the power supply 130 to "power on" at the power supply 130. The message is received by the power supply 130 through the communication interface 120. The message sent by the controller 210 reaches the communication interface 120 after traveling through wired or wireless control/data lines 150, which may be a communication protocol such as Universal Serial Bus (USB), CANopen, Ethernet, firewire, or RS232, for example.

At step 230, the power supply 130 acknowledges the "power on" at the power supply command message sent by the controller 210 through the wired or wireless command/data lines 150 to the communication interface 120. If the "power on" at the power supply is unsuccessful, the power supply 130 sends a failure message back to the controller 210 using the communication interface 120 and wired or wireless command/data lines 150. In an embodiment, the failure message may include other data regarding why the failure occurred. For example, accompanying the "power on" command, the controller 210 may have requested information regarding various diagnostics which, depending on the diagnostics requested and the operating level of the chosen diagnostics, may assist in determining what problems may exist if the "power on" fails. Messages sent by the controller 210 to the power supply 130 using the communication interface 120 may use single or multiple, wired or wireless, control/data lines 150.

Then, at step 240, if the "power on" at the power supply 130 was successful, the controller 210 may send a command to "activate outputs." By activating one or more outputs of the power supply 130, the power supply 130 may provide power to the device (load) 140. The "activate outputs" command is sent to the power supply 130 from the controller 210 using the communication interface 120 and single or multiple, wired or wireless, control/data lines 150.

At step 250, the power supply 130 acknowledges the "activate outputs" command message sent by the controller 210 through the wired or wireless command/data lines 150 to the communication interface 120. If the "activate outputs" command is unsuccessful, the power supply 130 sends a failure message back to the controller 210 using the communication interface 120 and wired or wireless command/data lines 150. In an embodiment, the failure message may include other data regarding why the failure occurred. For example, accompanying the "activate outputs," the controller 210 may have requested information regarding various diagnostics which, depending on the diagnostics requested and the operating level of the chosen diagnostics, may assist in determining what problems may exist if the "activate outputs" command fails. Such multiple messages sent by the controller 210 to the power supply 130 using the communication interface 120 may use single or multiple, wired or wireless, control/data lines 150.

At step 260, if the "activate outputs" command was successful, the device will be powered on. Once the device is powered on, the controller 210 may continue to monitor one or more diagnostics (depending on what diagnostics the controller 110 is programmed to monitor or what diagnostics a manual user of the controller 110 chooses to monitor) of the power supply 130 to ensure proper operation.

Figure 3:
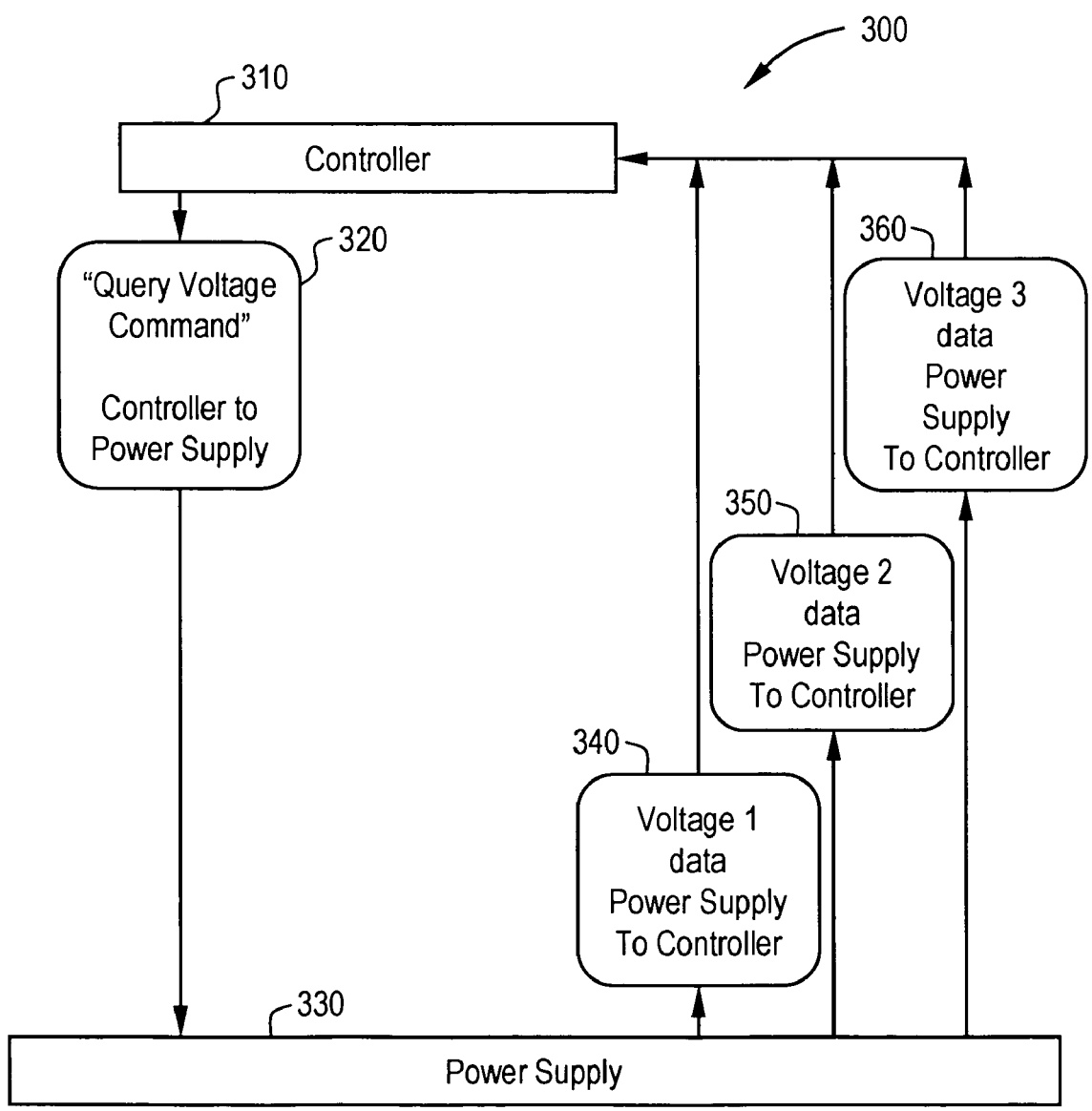
FIG. 3 illustrates an exemplary "query voltage" command sequence of a controller to a power supply with a communication interface, according to an embodiment of the present invention.

Certain embodiments facilitate transmission of status information for a power supply 130 to a controller 110. FIG. 3 illustrates a flow diagram of an exemplary "query voltage" command sequence 300 of a controller 310 to a power supply 330 with a communication interface 120, according to an embodiment of the present invention.

In the FIG. 3 "query voltage" command sequence, the controller 310 sends a "query voltage" command 320 to the power supply 330 via wired or wireless control/data lines 150 and a communication interface 120 which may be attached to the power supply 310. The "query voltage" command 320 requests feedback from power supply 330 regarding the output voltage data of the power supply 330.

Next, the power supply 330 sends one or more feedback messages 340-360 through the communication interface and wired or wireless control/data lines 150 to the controller 310. The "query voltage" command 320 may include a single feedback message 340-360 with all the requested data and/or multiple feedback messages 340-360 reporting the voltage data for various output voltages or reporting the voltage data at various time intervals, for example.

Figure 4:
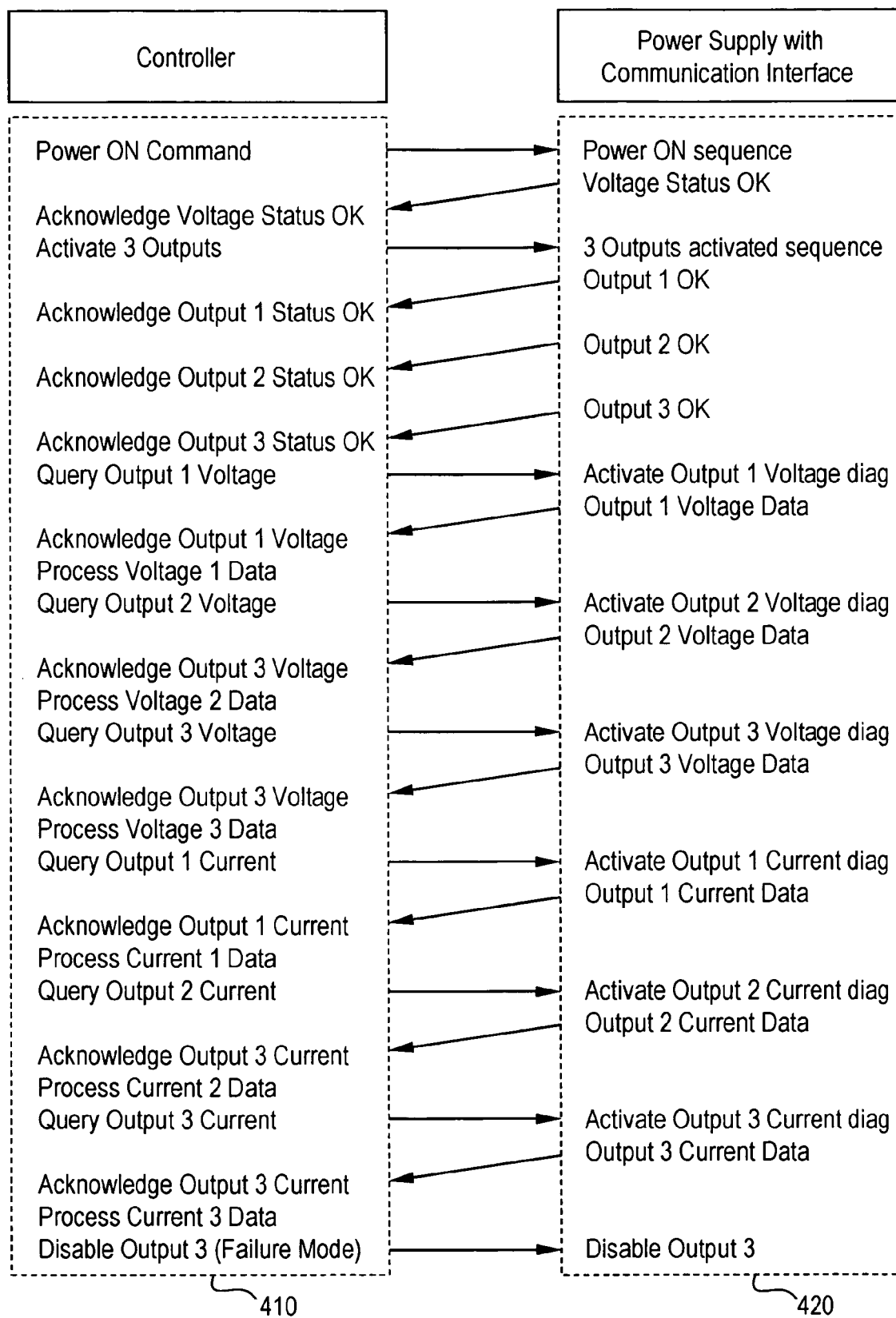
FIG. 4 illustrates an exemplary communication sequence between a controller and a power supply with a communication interface, according to an embodiment of the present invention.

FIG. 4 illustrates a flow chart of an exemplary communication sequence between a controller 110 and a power supply 130 with a communication interface, according to an embodiment of the present invention. In the FIG. 4 example, the controller 110 sends commands 410 and receives acknowledgements/feedback 410. The power supply 130 with communication interface 120 receives commands 420 from the controller 110 and sends feedback 420 to the controller 110. For example, the controller 110 may send a "power on" command 410 to the power supply 130 with communication interface 120. Once received and acted upon, the power supply 130 with communication interface 120 will provide feedback by sending the controller a "voltage status OK" message 420, in this case. Then, after receiving the feedback "voltage status OK" message 420 from the power supply 130 with communication interface 120, the controller 110 may send other messages.

In the FIG. 4 example, the controller 110 queries for information related to various diagnostics such as the output voltage levels and output current levels. When the controller receives feedback related to the various diagnostics, the controller 110 processes the data to ensure that the data is within predetermined operating levels programmed into the controller 110. Alternatively, a user could manually view the processed data and make determinations on the controllers subsequent course of action. For example, in FIG. 4, the controller 110 queries the "Output 3 Current." The power supply 130 with communication interface 120 receives the query and sends feedback containing data on the "Output 3 Current" back to the controller 110. The controller 110 processes the "Output 3 Current" data and decides (either using programmed operating parameters or by a user manually deciding that current levels at "Output 3" are outside the appropriate operating range) that "Output 3" should be disabled and sends a command to the power supply 130 with communication interface 120 instructing the power supply 130 to disable "Output 3."

Thus, certain embodiments provide discrete control as well as feedback to indicate the status of the power supply while using a minimum number of control/data lines. By using a communication interface, the time and cost of installation and configuration may also be minimized. In certain embodiments, there may be more flexibility in the amount and variety of diagnostics that may be monitored. Further, the power supply diagnostics monitored may be easily reconfigured without expensive and time consuming reinstallation of control/data lines. Certain embodiments provide for an efficient, robust, cost effective system and method for communication between a controller and power supply using a standard communication interface.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

The invention claimed is:

1. A communication system, comprising: a device specific power supply having a plurality of diagnostics;
- at least one controller, configured for controlling said device specific power supply and monitoring said plurality of diagnostics of said device specific power supply;
- a communication interface at said device specific power supply configured to send and receive at least one signal exclusively between said at least one controller and said device specific power supply; and
- a load, configured to operate using the power provided by said device specific power supply,
- wherein said at least one controller is separate from said load.

2. The system of claim 1, wherein said device specific power supply is a detector power supply used in medical imaging devices.

3. The system of claim 1, wherein said communication interface is at least one of:
- a Universal Serial Bus (USB) communication interface,
- a CANopen communication interface,
- an Ethernet communication interface,
- a firewire communication interface, and
- an RS232 communication interface.

4. The system of claim 1, wherein said plurality of diagnostics comprises a plurality of:
- at least one voltage level,
- at least one current level,
- a power consumption level,
- a noise on the line level,
- at least one error status level,
- an On/Off level, and
- a standby level.

5. The system of claim 1, wherein said at least one controller reconfigures said plurality of diagnostics of said device specific power supply based on an at least one feedback message.

6. The system of claim 1, wherein said at least one signal is transmitted and received via a wireless connection.

7. A method for communication, said method comprising:
sending, from at least one controller to a device specific power supply comprising a communication interface dedicated to communications between said at least one controller and said device specific power supply, at least one command comprising at least one operation instruction for said device specific power supply and at least one request for at least one diagnostic of said device specific power supply;

receiving, at said device specific power supply via said communication interface, said at least one command and said at least one request for said at least one diagnostic of said device specific power supply;

responding to said at least one command and said at least one request for said at least one diagnostic of said device specific power supply with at least one feedback response message via said communication interface; and monitoring said at least one diagnostic of said device specific power supply using said at least one feedback response message sent by said device specific power supply to said at least one controller via said communication interface; and reconfiguring at least one diagnostic of said device specific power supply based at least in part on said at least one feedback response message.

8. The method of claim 7, wherein said at least one command is at least one of:
- a power on command,
- a power off command,
- a reset command, and
- a standby command.

9. The method of claim 7, wherein said at least one controller is a computer.

10. The method of claim 7, wherein said device specific power supply is a detector power supply used in medical imaging devices.

11. The method of claim 7, wherein said communication interface is at least one of:
- a Universal Serial Bus (USB) communication interface,
- a CANopen communication interface,
- an Ethernet communication interface,
- a firewire communication interface, and
- an RS232 communication interface.

12. The method of claim 7, wherein said at least one diagnostic is at least one of:
- at least one voltage level,
- at least one current level,
- a power consumption level,
- a noise on the line level,
- at least one error status level,
- an On/Off level, and
- a standby level.

13. The method of claim 7, wherein said communication interface is physically attached to said device specific power supply.

14. The method of claim 7, wherein said sending, responding, and receiving is via a wireless connection.

15. A computer-readable storage medium including a set of instructions for a computing device, the set of instructions comprising:
- a sending routine for routing at least one command message from at least one controller to a device specific power supply comprising a communication interface dedicated to communications between said at least one controller and said device specific power supply;
- a receiving routine for receiving said at least one command message at said communication interface and directing said at least one command message to said device specific power supply;
- a responding routine for routing at least one feedback message from said device specific power supply to said at least one controller via said communication interface, wherein said at least one feedback message responds to said at least one command message; and a monitoring routine for processing said at least one feedback message at said at least one controller and reconfiguring at least one diagnostic of said device specific power supply based on said at least one feedback message.

16. The set of instructions of claim 15, wherein said at least one command message comprises at least one command and at least one request for at least one diagnostic of said device specific power supply.

17. The set of instructions of claim 15, wherein said computing device is at least one of:
   a personal computer,
   a workstation,
   a single-board computer, and
   a Programmable Logic Device (PLD).

* * * * *